(12) United States Patent
Diaconescu et al.

(10) Patent No.: US 6,975,657 B1
(45) Date of Patent: Dec. 13, 2005

(54) SYSTEM AND METHOD FOR GENERATION OF LARGE CONCATENATED PAYLOADS

(75) Inventors: Luca R. Diaconescu, Ottawa (CA); Ronald J. Gagnon, Nepean (CA)

(73) Assignee: Nortel Networks Limited, St. Laurent (CA)

(*) Notice: Subject to any disclaimer, the term of this patent is extended or adjusted under 35 U.S.C. 154(b) by 1206 days.

(21) Appl. No.: 09/887,685

(22) Filed: Sep. 21, 2000

(51) Int. Cl.[7] .............................................. H04L 12/28
(52) U.S. Cl. ..................................................... 370/907
(58) Field of Search ....................................... 370/907

(56) References Cited

U.S. PATENT DOCUMENTS

| | | | | |
|---|---|---|---|---|
| 4,964,112 A | * | 10/1990 | Appelmann ................. | 370/248 |
| 5,455,832 A | * | 10/1995 | Bowmaster .................. | 714/712 |
| 6,058,119 A | * | 5/2000 | Engbersen et al. ......... | 370/466 |
| 6,765,928 B1 | * | 7/2004 | Sethuram et al. ........... | 370/476 |
| 2001/0012288 A1 | * | 8/2001 | Yu .............................. | 370/352 |

* cited by examiner

*Primary Examiner*—Huy D. Vu
*Assistant Examiner*—Cynthia L. Davis

(74) *Attorney, Agent, or Firm*—Borden Ladner Gervais LLP; Jeffrey M. Measures

(57) ABSTRACT

A data generator and a method for generating large concatenated SONET/SDH frame are provided. The method comprises initiating a set of programmable register values with frame parameters, generating data slices comprising a plurality of STS-1 blocks based on said frame parameters, and collecting the data slices to generate a frame. Whenever a large concatenation mode within said frame parameters assumes an ON state, the data slice generation includes, setting the pointer value to a predetermined fixed pointer value and generating payload bytes of every STS-1 block having a concatenation indication such that the B3 byte of the STS-1 block assumes a predetermined fixed B3 value. The data generator for generating SONET/SDH type data frames. The data generator comprises a plurality of processing strips for generating a plurality of associated data slices having STS-1 blocks. Each strip may operate in a large concatenation mode in which a fixed pointer value and a fixed B3 value in assumed for each STS-1 block within the data slice. A data collection block of the data generator collects generated data slices into a data frame. Among the advantages presented by the method and system of the preferred embodiments of the invention is the ability to generate arbitrary large concatenated payloads, without communication between processing strips of data generators.

5 Claims, 3 Drawing Sheets

SYSTEM AND METHOD FOR GENERATION OF LARGE CONCATENATED PAYLOADS

CROSS REFERENCE TO RELATED APPLICATIONS

The present application is related to co-pending and co-assigned U.S. patent application Ser. No. 09/663,823 "Pointer Processing and Path BIP-8 Computation for Large Concatenated Payloads", filed on Sep. 15, 2000.

MICROFICHE APPENDIX

Not applicable.

TECHNICAL FIELD

The present invention relates to optical communication networks, and in particular to data generation of large concatenated payloads within processing nodes of such a network.

BACKGROUND OF THE INVENTION

In optical networks today, processing nodes of the networks are designed for processing various types of data frames. During the design of such processing nodes, the designed systems are tested by generating and sending through these nodes test frames. In particular, data frames comprising concatenated payloads, such as frames based on the SONET or SDH standards, are commonly used for transmitting information across such networks and accordingly, the generation of similarly structured test frames is required.

A system generating data in various frame formats will be referred herein as a data generator. The present invention considers data generators comprising one or more processing strips. Each processing strip is capable of generating a data slice of a given size. In the case when a data generator comprises more processing strips, the data slices generated by the strips are collected together in the data frame to be generated. The size of the data frame thus generated is directed to the number of data slices collected, therefore the capacity of the data generator is given by the number of processing strips it has.

Data frames comprising large concatenated payloads such as the SONET/SDH type frames may be formed by pasting together several smaller size data slices. Therefore, the generation of such frames requires the use of a data generator with enough processing strips to account merely for the size of these frames. This requirement is easily overcome by known data generators, which may be designed to the required size by including enough processing strips. A more difficult requirement to meet arises from the concatenation feature of such frames. Collecting several data slices into a concatenated frame implies synchronization of all the processing strips contributing data slices to the concatenated frames, synchronization which must take place during the generation of the actual data slices. For example, in the case of SONET/SDH type frames, the synchronization implies acknowledging the correct pointer information at all contributing strips. In addition, various overhead bytes such as the B3 byte for SONET/SDH type frames of the concatenated frame are generated only in some data slices making up the final frame, but their value is dependent on the data generated on other slices.

Similar synchronization issues are described for example in co-pending and co-assigned application Ser. No. 09/663,823 "Pointer Processing and Path BIP-8 Computation for Large Concatenated Payloads", filed on Sep. 15, 2000, with respect to pointer processing machines structured on arrays of parallel pointer processing strips. In the described pointer processing machines, the synchronization issues are solved by establishing a bi-directional flow of data along the contributing pointer processing strips. However, such a bi-directional data flow along the pointer processing strips requires a complex design, with a large hardware overhead. For example, communicating B3 byte data only from a strip to an adjacent strip requires 9 communication pins on each strip, where 8 of these pins are for the actual B3 byte value and an extra pin is used to send a concatenation signal among the two strips.

SUMMARY OF THE INVENTION

It is an object of the invention to provide a novel system and method for generating large concatenated payloads within a processing node of an optical communications network.

According to one aspect of the invention there is provided a method for generating a data slice of a SONET/SDH type data frame, wherein the data slice has a plurality of STS-1 blocks. For each STS-1 block within the data slice, the method comprises reading a pointer state indication and, whenever the pointer state indication has a concatenation indication, generating payload bytes of the STS-1 block such that the B3 byte of the STS-1 block assumes a predetermined B3 fixed value. According to the preferred embodiment, the payload for each concatenated STS-1 block within a data slice in a large concatenation mode is generated such that B3=0.

According to another aspect of the invention there is provided a method for generating a SONET/SDH frame. The method comprises initiating a set of programmable register values with frame parameters, generating data slices comprising a plurality of STS-1 blocks based on said frame parameters, and collecting the data slices to generate a frame. Whenever a large concatenation mode within said frame parameters assumes an ON state, the data slice generation includes, setting the pointer value to a predetermined fixed pointer value and generating payload bytes of every STS-1 block having a concatenation indication such that the B3 byte of the STS-1 block assumes a predetermined fixed B3 value.

According to another aspect of the invention there is provided a data generator for generating SONET/SDH type data frames. The data generator comprises a plurality of processing strips for generating a plurality of associated data slices having STS-1 blocks. Each strip may operate in a large concatenation mode in which a fixed pointer value and a fixed B3 value is assumed for each STS-1 block within the data slice. A data collection block of the data generator collects generated data slices into a data frame.

Among the advantages presented by the method and system of the preferred embodiments of the invention is the ability to generate arbitrary large concatenated payloads, without communication between processing strips of data generators. Other advantages, objects, and features of the presented invention will be readily apparent to those skilled in the art from a review of the following detailed description of preferred embodiments in conjunction with the accompanying drawings and claims.

BRIEF DESCRIPTION OF THE DRAWINGS

The present invention will now be explained, by way of example only, with reference to certain embodiments and the attached Figures in which.

Similar references are used in different drawings to denote similar components.

DETAILED DESCRIPTION OF EMBODIMENTS OF THE INVENTION

Figure 1:
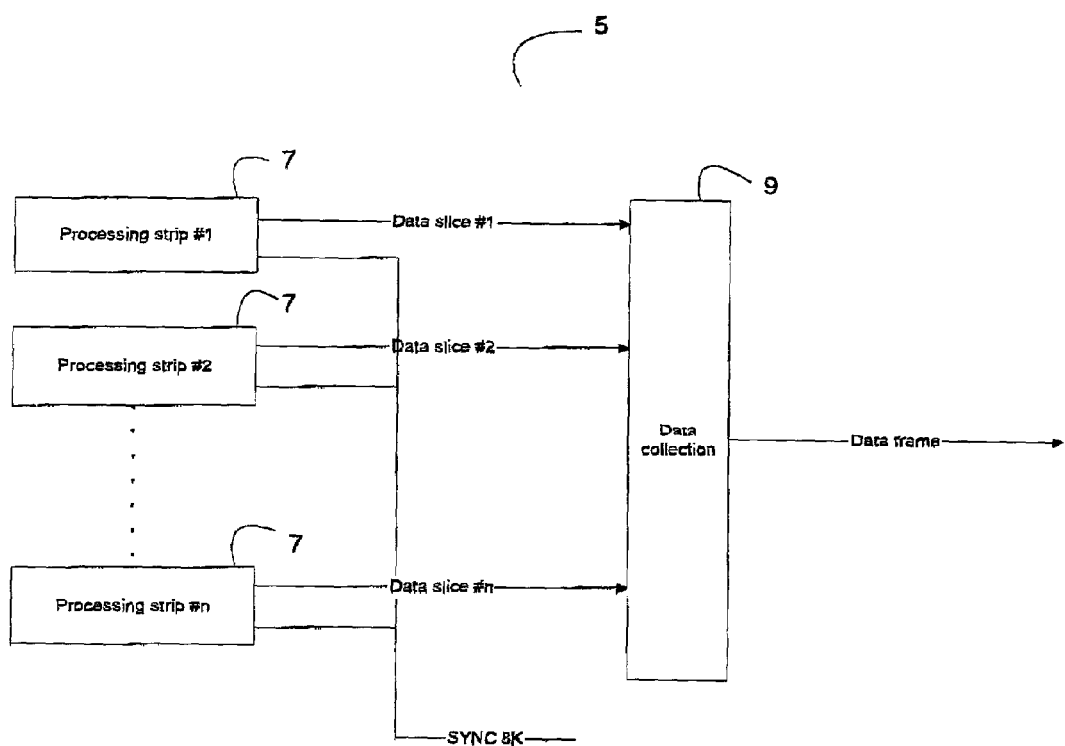
FIG. 1 is a block diagram of a data generator according to an embodiment of the present invention.
Figure 2:
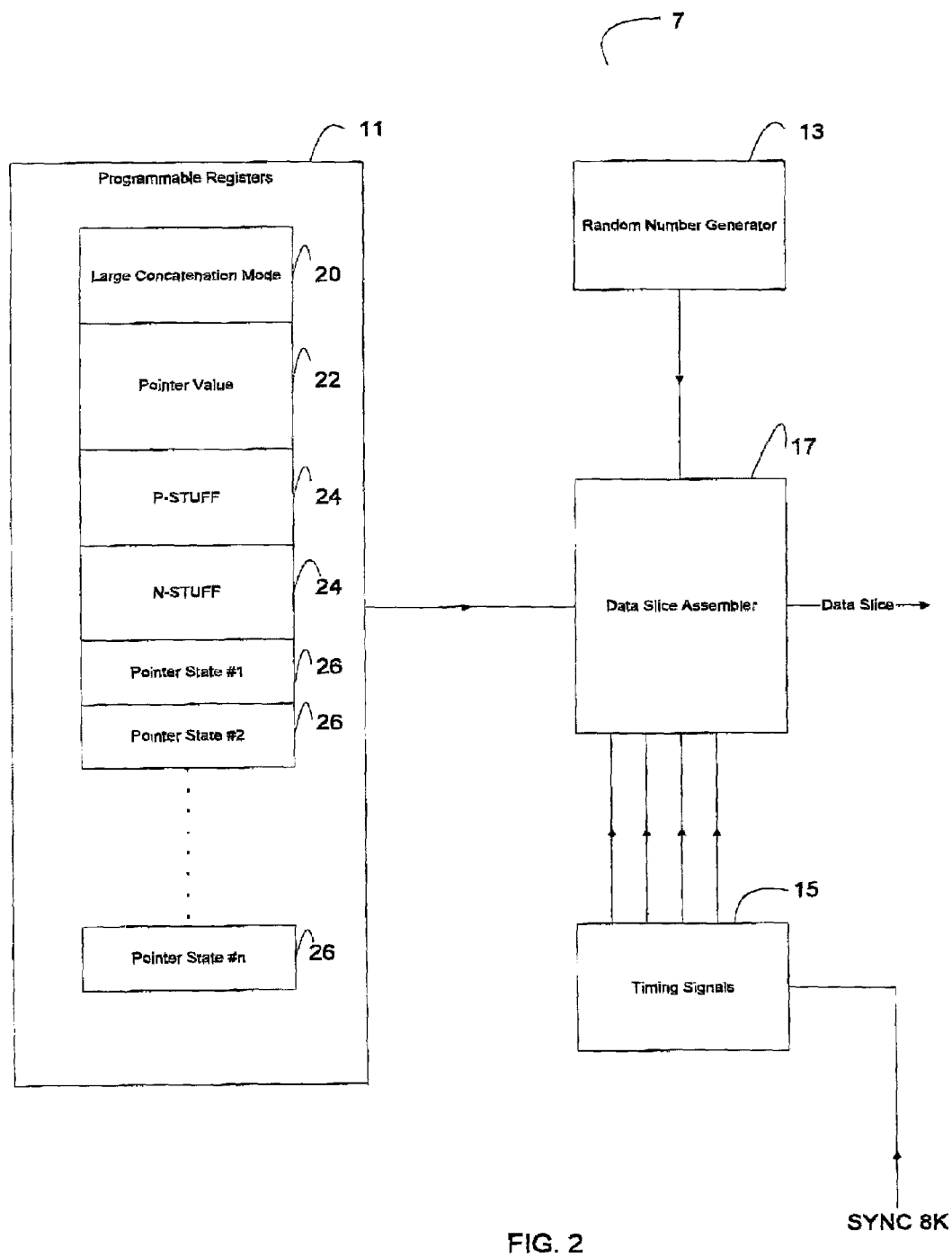
FIG. 2 is a block diagram of a processing strip within the data generator in FIG. 1.
Figure 3:
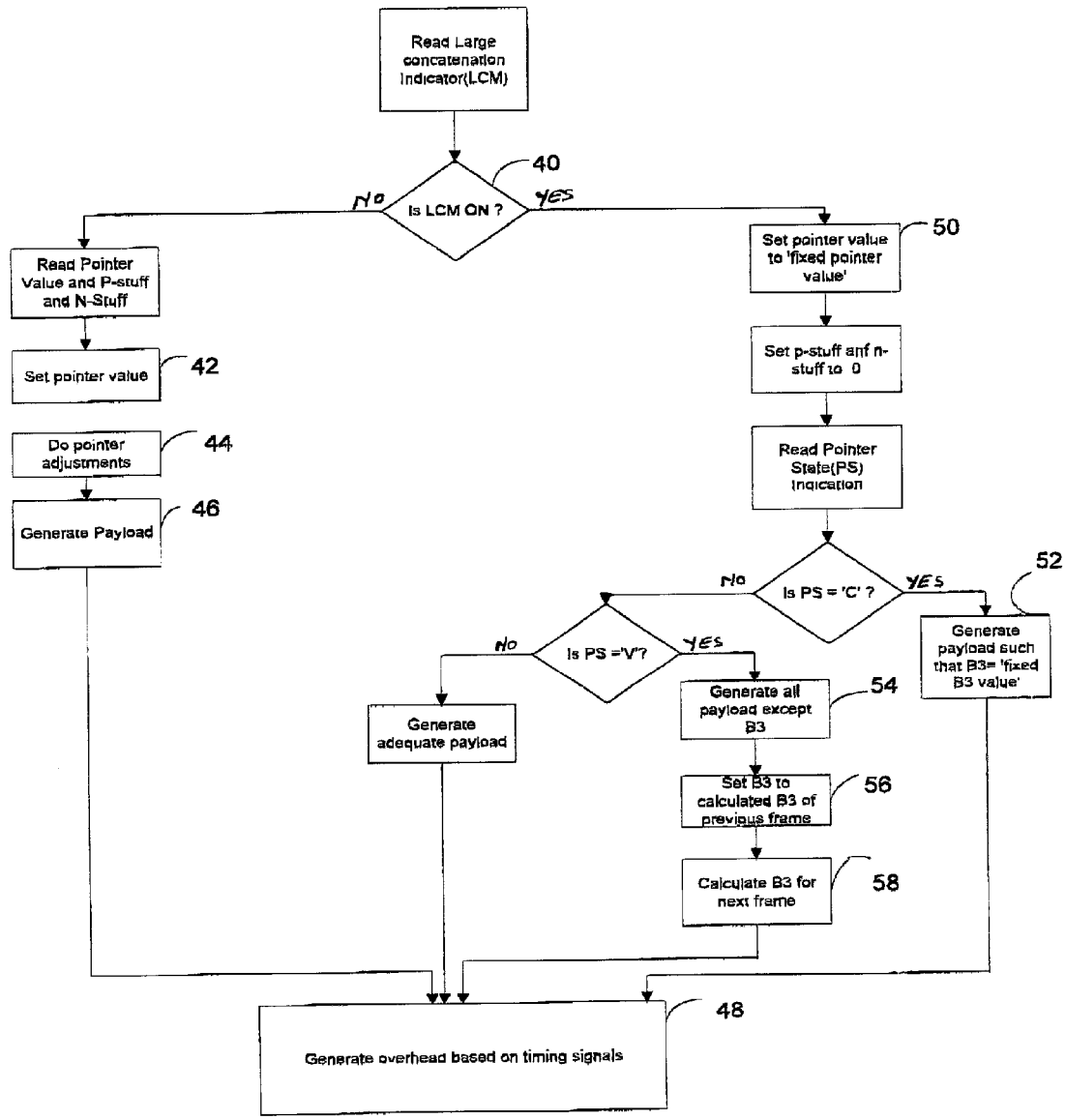
FIG. 3 is a flow chart of a method of generating a data slice according to a preferred embodiment of the present invention.

Referring to FIGS. 1 to 3, a system for generation of large concatenated payloads according to an embodiment of the present invention is described. FIG. 1 illustrates a data generator according to an embodiment of the present invention. The data generator 5 comprises a plurality of processing strips 7 and a data collection block 9. The processing strips may be implemented on one or more Application Specific Integrated Circuits (ASIC's) or other integrated circuits.

Each processing strip 7 generates and sends a data slice to the data collection block 9. According to a preferred embodiment, each processing strip generates SONET/SDH formatted data slices having a specific size. SONET/SDH data frame sizes can be measured in STS-1(Synchronous Transport Signal level 1) units. Therefore, in the preferred embodiment each processing strip 7 of the data generator 5 produces STS-n data slices, which are data slices comprising n STS-1 SONET building blocks pasted together. Accordingly, the processing strips 7 are also referred herein as STS-n strip. The data slices generated by the processing strips 7 are collected by the data collection block 9 into a data frame according to a pre-established collection order, such as the SONET transmission order in the case of a preferred embodiment. According to the present invention, the data frames generated may comprise concatenated payloads ranging from an STS-2c up to an STS-Nc, where N is limited only by the number of processing strips 7 included in the data generator 5. Advantageously, the generator of concatenated frames having a size larger than the size of a single data slice does not require any hardware overhead for communication among processing strips 7.

FIG. 2 shows a block diagram of an STS-n processing strip 7. The processing strip 7 comprises a set of programmable registers 11, a random number generator, a timing block 15 and a data slice assembler 17. In operation, the registers 11 receive a set of frame parameters indicating the desired format of the STS-n data slice to be generated from an operator through a microprocessor interface, for example. These values are sent to the data slice assembler 17 which interprets them to assemble data slices in the desired format. In addition to the register values, the data slice assembler 17 uses data from the random number generator 13 to generate payload data when appropriate, as detailed below, and signals from the timing block 15 to insert overhead bytes into the data slice assembled according to the requirements of the standard. The timing signals block receives as an input a SYNC 8K signal, which is an 8 kHz reference indicating the phase of the frame to be generated.

According to the preferred embodiment, the set of registers 11 comprises a Large Concatenation Mode register 20, a Pointer Value register 22, p-stuff and n-stuff registers 24 and n Pointer State registers 26. The Large concatenation Mode register 20 is a 1 bit register that indicates an ON or 'Fixed Pointer' state of the strip 7, or an OFF or 'Variable Pointer' state of the strip. In the ON or Fixed Pointer state, the data slice generated by the strip 7 may be part of a larger concatenated frame which requires the stacking of multiple data slices. In the OFF or Variable Pointer state, the data slice generated by the strip 7 cannot be part of larger concatenations. In the Off state, the strip 7 may generate only up to STS-nc signals. The Pointer Value register 22 has the initial value of the SONET/SDH pointer. This value can be changed by performing pointer adjustments, p-stuff and n-stuff, which are programmed through their corresponding registers 24. Each of the n Pointer State registers 26 corresponds to one of the STS-1 blocks to be incorporated in the STS-n data slice to be generated. Each Pointer state register 26 receives a 3-bit value that can represent one of the following five pointer states: a valid pointer 'V', a concatenation indication 'C', an alarm status indication 'AIS', an 'NDF' (new pointer or 'OOR' (pointer out-of-range).

Referring also to FIG. 3, the generation of a data slice by the strip 7 occurs as follows. Initially, the data slice generation process is split 40 into a Variable Pointer procedure, when the Large Concatenation Mode is OFF and Fixed Pointer procedure, when the Large concatenation mode is ON. The Variable Pointer procedure comprises setting the pointer value to the value in the Pointer Value register, at 42, making p-stuff and n-stuff adjustments at 44, generating randomly all payload bytes at 46. Additional overhead bytes for the data slice are generated based on timing signals from the Timing Signals block 15 at 48. The Fixed Pointer procedure comprises setting the pointer value to a fixed predetermined value referred to as "fixed pointer value" at 50. P-stuff and n-stuff values in the corresponding registers 26 are ignored, i.e. P-STUFF and N-STUFF values are set to 0, regardless of the values in the corresponding registers. For each STS-1 block in the data slice to be generated, the payload bytes are generated according to the associated pointer state indication, as follows: If the pointer state (PS) contains a concatenation indication 'C', the payload bytes are generated such that the B3 value for the STS-1 block becomes a predetermined fixed B3 value (52). Since the B3 value for a SONET/SDH frame is an even parity check path BIP(Byte Interleaved Parity)-8 value calculated by XOR-in all payload bytes of the frame, the above setting is preferably made by randomly generating all payload bytes except one and setting the remaining one such that the all payload bytes XOR-ed are a fixed B3 predetermined value. The preferred embodiment sets B3=0 for all STS-1 blocks having a concatenation indication, thus the remaining byte is set to be exactly the XOR value of the randomly generated payload bytes. If the pointer state (PS) contains a valid pointer 'V', all payload bytes except B3 are generated randomly, 54. The B3 byte takes the value of the B3 computed for the previous frame (56). Based on the payload bytes generated as such, the B3 value for the next frame is calculated (58). The generation of the STS-1 blocks for all other pointer states, 'AIS', 'NDF' and 'ODR', is done in any adequate mode, many of which are easily recognized by those skilled in the art. This cases are beyond the scope of the invention as in this cases the B3 does not contain a meaningful value. As in the Variable Pointer procedure, additional overhead bytes for the data slice are generated based on timing signals from the Timing Signals block 15 at 48.

In the preferred embodiment the fixed pointer value assigned at 50 for the pointer value for each STS-1 block comprising a concatenation indication 'C' is the same for all data slices generated by processing strips 7 contributing to a concatenated frame. This feature, together with the setting of the B3 within each concatenated STS-1 block on a slice to a predetermined fixed value, allow strips 7 to contribute data slices to a larger concatenated payload without communication among strips 7.

In addition, in the preferred embodiment, the data slice assembler 17 includes the capability to insert a Path Trace message. Pat Trace is a repetitive message which is inserted in the J1 byte over several frames. The Path Trace message is taken from an additional programmable register (not shown).

Numerous modifications, variations and adaptations may be made to the particular embodiment of the invention described in the documents attached herein, without departing from the scope of the invention, which is defined in the claims.

What is claimed is:

1. A method for generating a data slice of a SONET/SDH data frame, wherein the data slice has a plurality of STS-1 blocks, the method comprising steps of:
    a) reading a pointer state indication for one STS-1 block;
    b) whenever the pointer state indication has a concatenation indication, generating payload bytes of the STS-1 block such that the B3 byte of the STS-1 block assumes a predetermined fixed value; and
    c) repeating step a) and step b) for all STS-1 blocks within the data slice.

2. The method in claim 1 wherein the step of generating payload bytes comprises
    b1) selecting a fixed payload byte;
    b2) randomly generating all payload bytes except said fixed payload byte; and
    b3) assigning said fixed payload byte a value such that the B3 byte assumes a predetermined fixed B3 value.

3. The method in claim 1 wherein said predetermined fixed value is 0.

4. A method of generating a SONET/SDH frame, the method comprising steps of:
    A) initiating a set of programmable register values with frame parameters,
    B) generating data slices comprising a plurality of STS-1 blocks based on said frame parameters, said data slice generation including:
        whenever a large concatenation mode within said frame parameters assumes an ON state:
            a) setting the pointer value to a predetermined fixed pointer value; and
            b) generating payload bytes of every STS-1 block having a concatenation indication such that the B3 byte of the STS-1 block assumes a predetermined fixed B3 value;
    C) collecting the data slices to generate a frame.

5. A data generator for generating SONET/SDH data frames, the data generator comprising:
    a plurality of processing strips for generating a plurality of associated data slices having STS-1 blocks, wherein when each strip operates in a large concatenation mode, a fixed pointer value and a fixed B3 value is used for each STS-1 block within the data slice; and
    a data collection block for collecting generated data slices into a data frame.

* * * * *